United States Patent
Zhao et al.

(10) Patent No.: US 11,739,189 B2
(45) Date of Patent: Aug. 29, 2023

(54) COMPOSITION KIT FOR PREPARING POLYURETHANE FOAM AND PREPARATION METHOD AND APPLICATION THEREOF

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Shihu Zhao, Anhui (CN); Haixia Yuan, Anhui (CN); Junjie Lang, Anhui (CN); Yihui Xing, Anhui (CN); Yurong Kong, Anhui (CN)

(73) Assignees: HEFEI HUALING CO., LTD., Hefei (CN); HEFEI MIDEA REFRIGERATOR CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 17/251,763

(22) PCT Filed: Jan. 8, 2019

(86) PCT No.: PCT/CN2019/070796
§ 371 (c)(1),
(2) Date: Dec. 11, 2020

(87) PCT Pub. No.: WO2019/237728
PCT Pub. Date: Dec. 19, 2019

(65) Prior Publication Data
US 2021/0130565 A1    May 6, 2021

(30) Foreign Application Priority Data
Jun. 13, 2018   (CN) .......................... 201810610028.5

(51) Int. Cl.
| | | |
|---|---|---|
| C08G 18/18 | (2006.01) | |
| C08G 18/40 | (2006.01) | |
| C08G 18/42 | (2006.01) | |
| C08G 18/48 | (2006.01) | |
| C08G 18/50 | (2006.01) | |
| C08G 18/76 | (2006.01) | |
| C08J 9/00 | (2006.01) | |
| C08J 9/14 | (2006.01) | |
| C08L 75/08 | (2006.01) | |

(52) U.S. Cl.
CPC .......... *C08J 9/144* (2013.01); *C08G 18/1808* (2013.01); *C08G 18/1816* (2013.01); *C08G 18/1875* (2013.01); *C08G 18/4816* (2013.01); *C08G 18/5027* (2013.01); *C08G 18/7671* (2013.01); *C08J 9/141* (2013.01)

(58) Field of Classification Search
CPC ............. C08G 18/4018; C08G 18/4816; C08J 2201/022
See application file for complete search history.

(56) References Cited

U.S. PATENT DOCUMENTS

| | | | |
|---|---|---|---|
| 2010/0113635 A1 | 5/2010 | Hwang et al. | |
| 2016/0074886 A1 | 3/2016 | Gantenbein et al. | |
| 2020/0308362 A1* | 10/2020 | Thomas | C08G 18/381 |
| 2022/0088558 A1* | 3/2022 | Baumler | B01J 13/16 |

FOREIGN PATENT DOCUMENTS

| | | | | |
|---|---|---|---|---|
| CN | 2006-169474 A | | 6/2006 | |
| CN | 103183806 A | | 7/2013 | |
| CN | 104761698 A | | 7/2015 | |
| CN | 106188607 A | | 12/2016 | |
| CN | 106632979 A | | 5/2017 | |
| CN | 107501517 A | | 12/2017 | |
| CN | 107501518 A | | 12/2017 | |
| CN | 107814897 A | * | 3/2018 | |
| CN | 108976463 A | | 12/2018 | |
| CN | 110591034 A | * | 12/2019 | |
| CN | 109021280 B | * | 11/2021 | ......... C08G 18/4837 |
| GB | 2 412 374 A | | 9/2005 | |
| JP | 2006169474 A | * | 6/2006 | |
| WO | 99/60053 A1 | | 11/1999 | |
| WO | WO-2016150016 A1 | * | 9/2016 | ............. C08G 18/42 |
| WO | WO-2016164671 A1 | * | 10/2016 | ........... C08G 18/163 |

OTHER PUBLICATIONS

Machine translation of JP-2006169474-A obtained from the European Patent Office website in Feb. 2022.*
Machine translation of CN-109021280-B obtained from Clarivate Analytics in Nov. 2022.*

* cited by examiner

*Primary Examiner* — Melissa A Rioja
(74) *Attorney, Agent, or Firm* — Seed IP Law Group LLP

(57) ABSTRACT

A composition kit for preparing a polyurethane foam and a preparation method and applications thereof are provided. The composition kit for preparing a polyurethane foam includes a first component and a second component. The first component and the second component are disposed in different containers respectively. The first component includes an organic isocyanate and a low boiling point foaming agent. The second component includes a polyol composition, a high boiling point foaming agent, a composite catalyst, water, and a silicone oil.

18 Claims, No Drawings

COMPOSITION KIT FOR PREPARING POLYURETHANE FOAM AND PREPARATION METHOD AND APPLICATION THEREOF

CROSS-REFERENCE TO RELATED APPLICATIONS

This application claims priority to and benefits of Chinese Patent application Serial No. 201810610028.5, filed Jun. 13, 2018, the entire content of which is incorporated herein by reference.

TECHNICAL FIELD

The present disclosure relates to a field of material science, and more particularly, to a composition kit for preparing a polyurethane foam and its preparation method, and a polyurethane foam and its preparation method.

BACKGROUND

Polyurethane foam is a high-efficiency heat insulation material widely used in refrigerators and freezers, and is normally made using environmentally friendly foaming agents. The foaming agent is selected according to requirements for the ozone destruction potential (ODP) value, and for the global warming potential (GWP) value. At present, the environmentally friendly and efficient foaming agents commonly used are pentane, trans-1-chloro-3,3,3-trifluoropropene (LBA), and 1,1,1,4,4,4-hexafluorobutene, etc. In order to meet the requirements of low density, low thermal conductivity, and rapid demolding in the refrigerator and freezer industry, a high dose of the foaming agent is required to ensure the thermal conductivity of the foam, and a low boiling point foaming agent is used to ensure the dimensional stability of the low density foam. The low boiling point foaming agent is a foaming agent which is gaseous at room temperature, such as butane, 1,1-difluoroethane (RFC-152a), 1,1,1,2-tetrafluoroethane (HFC-134a), trans-1,3,3,3-tetrafluoropropene (HFO-1234ze) and 2,3,3,3-tetrafluoropropene (HFO-1234yf).

However, there is still a need for developing a foam formulation having a low density, a low thermal conductivity, and a rapid demolding performance.

SUMMARY

The present disclosure is provided by the inventors on the basis of the study on the following issues and facts.

At present, a common method for preparing a polyurethane foam in the art is to pre-mix a foaming agent and a combined polyether to prepare a white material. The pre-mixed white material and an isocyanate (black material) are foamed at 18 to 24° C. Since the pre-mixed white material contains a large amount of the foaming agent, the solubility of the foaming agent in the combined polyether is limited, and the low boiling point foaming agent may be escaped. In order to prevent the escape of the low boiling foaming agent, a temperature of the combined polyether raw materials should be lowered, which makes the foaming agent less soluble in the combined polyether and easier to become a separated phase.

On the other hand, the low temperature of the raw materials increases the viscosity of the materials, which makes mixing effect of the materials on a high pressure foaming machine worse, and finally leads to adverse effects such as a decrease of a dimensional stability of the prepared foam and an increase of a K value (i.e., a polymerization degree). Meanwhile, in this case, applications of raw materials such as high viscosity polyether polyol and polyester polyol having good performances, such as a high strength, a high functionality and a low thermal conductivity, are limited in the foaming process. In addition, after mixing and foaming via a high pressure foaming machine gun head, the low boiling point foaming agent makes the foaming rise quickly, and makes the cream time very short, such that the flow is limited in refrigerator and/or large refrigerator having a narrow flow channel and/or a complex structure. This results in many bubbles on surface of and inside the foam. Therefore, the application of the low boiling foaming agents is also limited.

Accordingly, the present disclosure provides a composition kit for preparing a polyurethane foam and its preparation method, as well as a polyurethane foam and its preparation method. When using the composition kit for preparing the polyurethane foam, on the basis of different boiling points of the foaming agents, a low boiling point foaming agent is mixed with a raw material such as an organic isocyanate as the first component, and a high boiling point foaming agent is mixed with a raw material such as a polyol composition as the second component. This allows to make the best utilization of the foaming agents having different performances, broaden the range of options for the foaming agents, and improve performances of the prepared polyurethane foam.

In an aspect of the present disclosure, the present disclosure provides a composition kit for preparing a polyurethane foam. In an embodiment of the present disclosure, the composition kit includes a first component and a second component disposed in different containers, respectively. The first component includes an organic isocyanate and a low boiling point foaming agent. The second component includes a polyol composition, a high boiling point foaming agent, a composite catalyst, water and a silicone oil.

With the composition kit for preparing the polyurethane foam, by mixing the low boiling point foaming agent with the raw material such as the organic isocyanate as the first component, and applying the first component at a lower temperature, on one hand, the escape of the low boiling point foaming agent may be prevented to improve the stability of the first component, and amounts of bubbles and pores in the foam may be significantly reduced; on the other hand, the organic isocyanate has a low viscosity and a lower temperature will not lead to an excessive high viscosity. By mixing the high boiling point foaming agent with the polyol composition and other raw materials as the second component, and applying the second component at a higher temperature, the viscosity of the second component can be significantly reduced, and thus the components with higher viscosity such as high performance (i.e., high functionality) polyether polyols can be added into the second component, which not only broadens the range of choice for the foaming agents, but also significantly improves the strength of the prepared polyurethane foam and reduces density and thermal conductivity of the prepared polyurethane foam.

In addition, the composite catalyst in the second component may further improve the foaming performance of the second component, and silicone oil may further improve the foaming stability and long-term storage stability of the polyol composition (i.e., the combined polyether), thus further improving the stability of the prepared polyurethane foam. Therefore, with the composition kit for preparing the polyurethane foam, on the basis of different boiling points of the foaming agents, the low boiling point foaming agent is mixed with the raw material such as an organic isocyanate as the first component, the high boiling point foaming agent is mixed with the raw material such as the polyol composition as the second component, together with suitable catalyst and surfactant, so as to make the best of the foaming agents having different performances, broaden the range of options for the foaming agents, and improve performances of the prepared polyurethane foam.

In some embodiments of the present disclosure, the first component further includes an organosilicone surfactant.

In some embodiments of the present disclosure, the first component includes 100 parts by weight of the organic isocyanate, 1 to 30 parts by weight of the low boiling point foaming agent and less than 3 parts by weight of the organosilicone surfactant.

In some embodiments of the present disclosure, the second component includes 100 parts by weight of the polyol composition, 5 to 16 parts by weight of the high boiling point foaming agent, 1 to 6 parts by weight of the composite catalyst, 1 to 2.5 parts by weight of water, and 1 to 3 parts by weight of the silicone oil.

In some embodiments of the present disclosure, the organic isocyanate is a polymeric methylenediphenyl diisocyanate (polymeric MDI) having an isocyanate group content of 30% to 32%.

In some embodiments of the present disclosure, the low boiling point foaming agent includes two or more foaming agents having a boiling point below 0° C.

In some embodiments of the present disclosure, the low boiling point foaming agent is at least one selected from 1,1,1,2-tetrafluoroethane (R134a), 1,1-difluoroethane (R152a), trans-1,3,3,3-tetrafluoropropene (HFO-1234ze) and butane.

In some embodiments of the present disclosure, the first component further includes at least one of trans-1-chloro-3,3,3-trifluoropropene (LBA), cyclopentane, isopentane, n-pentane, methyl formate, formic acid and 1,1,1,3,3-pentafluoropropane (HFC-245fa). It has been discovered by the inventors that under the premise of not affecting the performance of the foaming agent, some foaming agents with a higher boiling point may also be added to the first component, resulting in a broadened range of choice for the low boiling point foaming agents.

In some embodiments of the present disclosure, the polyol composition includes 20 to 60 parts by weight of sucrose-based polyether polyol, 10 to 35 parts by weight of sorbitol-based polyether polyol, 5 to 15 parts by weight of sucrose and propanediol-based polyether polyol, 20 to 35 parts by weight of toluene diamine and triethanolamine-based polyether polyol and 5 to 15 parts by weight of phthalic anhydride-based polyester polyol.

In some embodiments of the present disclosure, the high boiling point foaming agent is at least one selected from trans-1-chloro-3,3,3-trifluoropropene, 1,1,1,4,4,4-hexafluorobutene, cyclopentane, isopentane and 1,1,1,3,3-pentafluoropropane.

In some embodiments of the present disclosure, the composite catalyst includes a foaming catalyst, a gel catalyst and a polymeric catalyst.

In some embodiments of the present disclosure, the foaming catalyst is at least one selected from pentamethyldiethylenetriamine, bis-dimethylaminoethyl ether, N-methyldicyclohexylamine and tetramethylhexamethylenediamine.

In some embodiments of the present disclosure, the gel catalyst is at least one selected from dimethylcyclohexylamine, 1,2-dimethylimidazole and dimethyl benzylamine.

In some embodiments of the present disclosure, the polymeric catalyst is at least one selected from (2-hydroxypropyl)trimethylammonium formate, ethyl quaternary ammonium salt and octyl quaternary ammonium salt.

In some embodiments of the present disclosure, the composite catalyst includes 1.2 to 2.2 parts by weight of pentamethyldiethylenetriamine, 6 to 8 parts by weight of dimethyl cyclohexylamine and 1.5 to 2.2 parts by weight of (2-hydroxypropyl)trimethylammonium formate.

In some embodiments of the present disclosure, the composite catalyst includes 1.8 to 2.0 parts by weight of pentamethyldiethylenetriamine, 8 parts by weight of dimethylcyclohexaneamine and 1.8 to 2.0 parts by weight of (2-hydroxypropyl)trimethylammonium formate.

In another aspect of the present disclosure, the present disclosure provides a method for preparing the composition kit for preparing the polyurethane foam in the above embodiments. The method includes:

(1) mixing the organic isocyanate and the low boiling point foaming agent to obtain the first component of the composition kit;

(2) mixing the polyol composition, the composite catalyst, water and the silicone oil to obtain a second mixture;

(3) mixing the second mixture with the high boiling point foaming agent to obtain the second component of the composition kit.

Therefore, the method can effectively prepare the composition kit for preparing the polyurethane foam of the above-mentioned embodiments. With the composition kit for preparing the polyurethane foam, on the basis of different boiling points of the foaming agents, the low boiling point foaming agent is mixed with the raw material such as an organic isocyanate as the first component, the high boiling point foaming agent is mixed with the raw material such as the polyol composition as the second component, together with suitable catalyst and surfactant, so as to make the best of the foaming agents having different performances, broaden the range of options for the foaming agents, and improve performances of the prepared polyurethane foam.

In some embodiments of the present disclosure, in step (1), the mixing is performed under a pressure of 0.4 to 0.6 MPa for 0.5 to 1.0 h, and a temperature of the first component is in a range of 0 to 20° C.

In some embodiments of the present disclosure, in step (2), the mixing is performed under a pressure of 0.1 to 0.2 MPa and at a temperature of 23 to 27° C. for 0.5 to 1.0 h.

In some embodiments of the present disclosure, in step (3), the mixing is performed under a pressure of 0.2 to 0.5 MPa for 0.5 to 1.0 h, and a temperature of the second component is in a range of 20 to 40° C.

In some embodiments of the present disclosure, step (1) includes mixing the organic isocyanate and the organosilicone surfactant to obtain a first mixture, and mixing the first mixture and the low boiling point foaming agent to obtain the first component of the composition kit.

In some embodiments of the present disclosure, step (1) includes mixing the organic isocyanate, the low boiling point foaming agent and the high boiling point foaming agent to obtain the first component of the composition kit. The high boiling point foaming agent is at least one of trans-1-chloro-3,3,3-trifluoropropene, cyclopentane, isopentane, n-pentane, methyl formate, formic acid and 1,1,1,3,3-pentafluoropropane.

In a further aspect of the present disclosure, the present disclosure provides a method for preparing a polyurethane foam. The method includes:

controlling a temperature of the first component in the composition kit for preparing the polyurethane foam in a range of 0 to 20° C. to obtain a temperature-controlled first component;

controlling a temperature of the second component in the composition kit for preparing the polyurethane foam in a range of 20 to 40° C. to obtain a temperature-controlled second component; and mixing the temperature-controlled first component and the temperature-controlled second component in a mass ratio of 1:(1 to 0.625) for foaming to obtain the polyurethane foam.

With the method for preparing the polyurethane foam, the polyurethane foam is prepared with the first component including the low boiling point foaming agent and the organic isocyanate and the second component including the high boiling point foaming agent and the polyol composition at different material temperature control conditions. Specifically, the temperature of the first component is low, so as to inhibit the volatilization of the low boiling foaming agent pre-mixed with the organic isocyanate, improve the stability of the organic isocyanate, and reduce the amounts of bubbles and pores in the foam. Moreover, the organic isocyanate has a low viscosity and a low temperature will not lead to an excessive high viscosity. The temperature of the second component is higher, which may significantly reduce the viscosity of the polyol composition, such that the components with higher viscosity such as high performance (i.e., high functionality) polyether polyols can be added into the second component, which not only broadens the range of choice for the foaming agents, but also significantly improves the strength of the prepared polyurethane foam and reduces density and thermal conductivity of the prepared polyurethane foam.

Therefore, with the method for preparing the polyurethane foam of the present disclosure, the low boiling point foaming agent is pre-mixed in the first component, the high boiling point foaming agent is pre-mixed in the second component, and the temperatures of the first component and the second component are controlled respectively, so as to make the best of the foaming agents having different performances, broaden the range of options for the foaming agents, and improve performances of the prepared polyurethane foam.

In a still further aspect of the present disclosure, the present disclosure provides a polyurethane foam. The polyurethane foam is prepared by the method for preparing the polyurethane foam as described in the above embodiments. Therefore, the polyurethane foam has the advantages of high strength, good thermal conductivity, less surface foam, low porosity, good flowability and high demolding performance, which may greatly shorten the demolding time and improve the work efficiency in the applications.

Additional aspects and advantages of embodiments of present disclosure will be given in part in the following descriptions, become apparent in part from the following descriptions, or be learned from the practice of the embodiments of the present disclosure.

DETAILED DESCRIPTION

The embodiments of the present disclosure are described in detail below. The embodiments described below are exemplary, are only used to generally understand the present disclosure, and shall not be construed to limit the present disclosure. For techniques or conditions not specifically indicated in the embodiments, they shall be carried out in accordance with the techniques or conditions described in the literatures in the art or in accordance with the product specifications. Reagents or instruments used without manufacturer indication are common products which are commercially available.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present invention, "a plurality of" means at least two, for example, two or three, unless specified otherwise.

In the present disclosure, unless specified otherwise, the terms have the following definitions.

Low boiling point foaming agent: a foaming agent having a boiling point below 0° C. under atmospheric pressure.

High boiling point foaming agent: a foaming agent having a boiling point higher than 0° C. under atmospheric pressure.

Minimum filling weight (MFW): a minimum weight, in a unit of g, required for full filling a mold.

Overfill material: injection weight×100/MFW, in a unit of %.

Molding density: a core density of a foam without crust, i.e., an effective density of the foam.

Cream time: a time period from a time when materials begin to mix to a time when after the mixed materials whiten.

Fiber time: a time period from a time when materials begin to mix to a time when fibers are drawn by taking out a rod from foam.

Demolding time: a time period from a time when foam is injected to a mold to a time when the mold is open.

Free foam density: a density of foam prepared under a condition that foaming is performed in a free state (without a mold).

In an aspect of the present disclosure, the present disclosure provides a composition kit for preparing a polyurethane foam. In an embodiment of the present disclosure, the composition kit includes a first component and a second component disposed in different containers, respectively. The first component includes an organic isocyanate and a low boiling point foaming agent. The second component includes a polyol composition, a high boiling point foaming agent, a composite catalyst, water and a silicone oil.

With the composition kit for preparing the polyurethane foam, by mixing the low boiling point foaming agent with the raw material such as the organic isocyanate as the first component, and applying the first component at a lower temperature, on one hand, the escape of the low boiling point foaming agent may be prevented to improve the stability of the first component, and amounts of bubbles and pores in the foam may be significantly reduced; on the other hand, the organic isocyanate has a low viscosity and a lower temperature will not lead to an excessive high viscosity. By mixing the high boiling point foaming agent with the polyol composition and other raw materials as the second component, and applying the second component at a higher temperature, the viscosity of the second component can be significantly reduced, and thus the components with higher viscosity such as high performance (i.e., high functionality) polyether polyols can be added into the second component, which not only broadens the range of choice for the foaming agents, but also significantly improves the strength of the prepared polyurethane foam and reduces density and thermal conductivity of the prepared polyurethane foam.

In addition, the composite catalyst in the second component may further improve the foaming performance of the second component, and silicone oil may further improve the foaming stability and long-term storage stability of the polyol composition (i.e., the combined polyether), thus further improving the stability of the prepared polyurethane foam. Therefore, with the composition kit for preparing the polyurethane foam, on the basis of different boiling points of the foaming agents, the low boiling point foaming agent is mixed with the raw material such as an organic isocyanate as the first component, the high boiling point foaming agent is mixed with the raw material such as the polyol composition as the second component, together with suitable catalyst and surfactant, so as to make the best of the foaming agents having different performances, broaden the range of options for the foaming agents, and improve performances of the prepared polyurethane foam.

In some embodiments of the present disclosure, the first component further includes an organosilicone surfactant. By adding the organosilicone surfactant in the first component, amphipathy and dispersibility of the first component may be further improved, thus improving the foaming effect.

In some embodiments of the present disclosure, the first component includes 100 parts by weight of the organic isocyanate, 1 to 30 parts by weight of the low boiling point foaming agent and less than 3 parts by weight of the organosilicone surfactant. Therefore, a greater amount of the low boiling point foaming agent can be added in the first component, which can make the prepared polyurethane foam have higher dimensional stability under a low density condition, thus reducing the cost of the foam. The above-mentioned organosilicone surfactant can be a surfactant that is non-reactive or difficult to react with isocyanate, which is well known to those skilled in the art. The application of the organosilicone surfactant in above mentioned ratio may further improve the amphipathy and dispersibility of the first component and improve the foaming effect. It has been discovered by the inventors that the compatibility of the organic isocyanate and the low boiling point foaming agent is good, and the addition of the foaming agent to the organic isocyanate can greatly reduce the viscosity of the first component. The temperature of the first component may be appropriately lowered to prevent the foaming agent from easily escaping from the first component, and at the same time to ensure that the viscosity of the first component at the low temperature is similar to the viscosity of the isocyanate at room temperature.

In some embodiments of the present disclosure, the second component includes 100 parts by weight of the polyol composition, 5 to 16 parts by weight of the high boiling point foaming agent, 1 to 6 parts by weight of the composite catalyst, 1 to 2.5 parts by weight of water, and 1 to 3 parts by weight of the silicone oil. Since the second component can be used at a higher temperature, under the premise of maintaining an appropriate viscosity, more weight parts of polyol composition (i.e., the combined polyether) can be added to make the second component have a higher foaming performance. The second component contains a relatively small amount of the high boiling point foaming agent, and the solubility of the foaming agent in the combined polyether increases with the increase of temperature, such that even if the temperature of the second component is increased, the foaming agent will not be easily escaped. At the same time, the viscosity of the second component at temperatures of 20 to 40° C. is close to the viscosity of the combined polyether at temperatures of 18 to 20° C.

In some embodiments of the present disclosure, the organic isocyanate is a polymeric methylenediphenyl diisocyanate (polymeric MDI) having an isocyanate group (—NCO group) content of 30% to 32%.

In some embodiments of the present disclosure, the low boiling point foaming agent includes two or more foaming agents having a boiling point below 0° C. Therefore, it is more suitable to combine the low boiling point foaming agents with the organic isocyanate to form the first component used at a low temperature. In some specific embodiments of the present disclosure, the low boiling point foaming agent is at least one selected from 1,1,1,2-tetrafluoroethane (R134a), 1,1-difluoroethane (R152a), trans-1,3,3,3-tetrafluoropropene (HFO-1234ze) and butane. The above foaming agents can effectively promote the foaming performance of the polyether, improve the cell structure, and are beneficial to the preparation of low density polyurethane foam.

In some embodiments of the present disclosure, the first component may be added with some high boiling point foaming agents, for example, at least one of trans-1-chloro-3,3,3-trifluoropropene (LBA), cyclopentane, isopentane, n-pentane, methyl formate, formic acid, 1,1,1,3,3-pentafluoropropane (HFC-245fa) and other foaming agents well known in the art. Under the premise of not affecting the performance of the foaming agent, some foaming agents with a higher boiling point may also be added to the first component, resulting in a broadened range of choice for the low boiling point foaming agents. Moreover, the pre-mixing of the organic isocyanate and the high boiling point foaming agent can also improve the performance of the foaming agent. In addition, by mixing the foaming agent of a low cost (such as methyl formate) into the first component, the storage stability of methyl formate and the combined polyether is also improved, and thus the foam cost is reduced.

In some embodiments of the present disclosure, the polyol composition includes 20 to 60 parts by weight of sucrose-based polyether polyol, 10 to 35 parts by weight of sorbitol-based polyether polyol, 5 to 15 parts by weight of sucrose and propanediol-based polyether polyol, 20 to 35 parts by weight of toluene diamine and triethanolamine-based polyether polyol and 5 to 15 parts by weight of phthalic anhydride-based polyester polyol. By using the above-mentioned types and amounts of high-functionality, high-viscosity polyols, supplemented by high-dosage physical foaming agents, the stability of the foaming process and the K value of the foam can be improved, and the demolding can be accelerated.

In some embodiments of the present disclosure, the sucrose-based polyether polyol is a high-functionality and high-viscosity polyether polyol polymerized by propylene oxide with sucrose as an initiator, having a hydroxyl value of 380 to 450 mg KOH/g, a viscosity of 15000 to 35000 mPa·s@25° C. and a functionality of 6 to 7. Such a high-functionality and high-viscosity sucrose-based polyether polyol may increase the strength of the polyurethane foam and improve pressure resistance and cell uniformity of the low-density foam.

In some embodiments of the present disclosure, the sorbitol-based polyether polyol is prepared by polymerizing propylene oxide with sorbitol as an initiator, and has a hydroxyl value of 380 to 470 mg KOH/g, a viscosity of 6000 to 9000 mPa·s@25° C. and a functionality of 5.5 to 6.

In some embodiments of the present disclosure, the sucrose and propanediol-based polyether polyol is prepared by polymerizing propylene oxide with sucrose and propanediol as a composite initiator, and has a hydroxyl value of 400 to 460 mg KOH/g, a viscosity of 1000 to 2500 mPa·s at 25° C. and a functionality of 3 to 5. A weight ratio of sucrose to propanediol is in a range of 1:(2 to 4). Therefore, the low-viscosity sucrose and propanediol-based polyether polyol may effectively improve the flowability of the polyurethane foam, and thus improve the performance of the polyurethane foam.

In some embodiments of the present disclosure, the toluene diamine and triethanolamine-based polyether polyol is prepared by addition reaction of alkylene oxide with toluene diamine and/or triethanolamine as an initiator, and has a viscosity of 10000 to 18000 mPa·s@25° C. and a hydroxyl value of 350 to 420 mg KOH/g, which may improve the thermal insulation performance of the polyurethane foam.

In some embodiments of the present disclosure, the phthalic anhydride-based polyester polyol is prepared by polycondensation reaction of aromatic acid anhydride, polyol and optionally substituted phthalic acid, and has a viscosity of 1000 to 2000 mPa·s@25° C. and a hydroxyl value of 200 to 350 mg KOH/g.

In some embodiments of the present disclosure, the high boiling point foaming agent is at least one selected from trans-1-chloro-3,3,3-trifluoropropene, 1,1,1,4,4,4-hexafluorobutene, cyclopentane, isopentane and 1,1,1,3,3-pentafluoropropane. In a specific embodiment of the present disclosure, the high boiling point foaming agent is a mixture of cyclopentane and isopentane, and a mass ratio of cyclopentane to isopentane is in a range of (7 to 9):(3 to 1).

In some embodiments of the present disclosure, the composite catalyst includes a foaming catalyst, a gel catalyst and a polymeric catalyst. In some embodiments of the present disclosure, the foaming catalyst is at least one selected from pentamethyldiethylenetriamine, bis-dimethylaminoethyl ether, N-methyldicyclohexylamine and tetramethylhexamethylenediamine. In some embodiments of the present disclosure, the gel catalyst is at least one selected from dimethylcyclohexylamine, 1,2-dimethylimidazole and dimethyl benzylamine. In some embodiments of the present disclosure, the polymeric catalyst is at least one selected from (2-hydroxypropyl) trimethylammonium formate, ethyl quaternary ammonium salt and octyl quaternary ammonium salt. Preferably, the composite catalyst includes 1.2 to 2.2 parts by weight of pentamethyldiethylenetriamine (PC-5), 6 to 8 parts by weight of dimethyl cyclohexylamine (PC-8) and 1.5 to 2.2 parts by weight of (2-hydroxypropyl)trimethylammonium formate (TMR-2). This would allow better utilization of the foaming agents.

In some embodiments of the present disclosure, the silicone oil is at least one selected from silicone oils L-6863, L-6988, L-6952, AK8812 and AK8809. Therefore, the Si—C bond in the silicone oil will not be easily hydrolyzed, which can effectively improve the foaming stability and long-term storage stability of the combined polyether, and further improve stability of rigid polyurethane foam plastic prepared therefrom.

In another aspect of the present disclosure, the present disclosure provides a method for preparing the composition kit for preparing the polyurethane foam in the above embodiments. The method includes:

(1) mixing the organic isocyanate and the low boiling point foaming agent to obtain the first component of the composition kit;

(2) mixing the polyol composition, the composite catalyst, water and the silicone oil to obtain a second mixture;

(3) mixing the second mixture with the high boiling point foaming agent to obtain the second component of the composition kit.

In some embodiments of the present disclosure, the organic isocyanate and the organosilicone surfactant are mixed under a pressure of 0.2 to 0.3 MPa, and a temperature of the first mixture obtained by mixing the organic isocyanate and the organosilicone surfactant is controlled at a temperature of 16 to 20° C. In step (1), the mixing is performed under a pressure of 0.4 to 0.6 MPa for 0.5 to 1.0 h, and a temperature of the first component is in a range of 0 to 20° C.

In some embodiments of the present disclosure, in step (2), the mixing is performed under a pressure of 0.1 to 0.2 MPa and at a temperature of 23 to 27° C. for 0.5 to 1.0 h.

In some embodiments of the present disclosure, in step (3), the mixing is performed under a pressure of 0.2 to 0.5 MPa for 0.5 to 1.0 h, and a temperature of the second component is in a range of 20 to 40° C.

Therefore, the method can effectively prepare the composition kit for preparing the polyurethane foam of the above-mentioned embodiments. With the composition kit for preparing the polyurethane foam, on the basis of different boiling points of the foaming agents, the low boiling point foaming agent is mixed with the raw material such as an organic isocyanate as the first component, the high boiling point foaming agent is mixed with the raw material such as the polyol composition as the second component, together with suitable catalyst and surfactant, so as to make the best of the foaming agents having different performances, broaden the range of options for the foaming agents, and improve performances of the prepared polyurethane foam.

In some embodiments of the present disclosure, step (1) includes mixing the organic isocyanate and the organosilicone surfactant to obtain a first mixture, and mixing the first mixture and the low boiling point foaming agent to obtain the first component of the composition kit. By adding the organosilicone surfactant in the first component, the amphipathy and dispersibility of the first component may be further improved, thus improving the foaming effect. In some embodiments of the present disclosure, the organic isocyanate and the organosilicone surfactant are mixed under a pressure of 0.2 to 0.3 MPa, and a temperature of the first mixture is controlled at a temperature of 16 to 20° C.

In some embodiments of the present disclosure, step (1) includes mixing the organic isocyanate, the low boiling point foaming agent and the high boiling point foaming agent to obtain the first component of the composition kit. The high boiling point foaming agent is at least one of trans-1-chloro-3,3,3-trifluoropropene, cyclopentane, isopentane, n-pentane, methyl formate, formic acid and 1,1,1,3,3-pentafluoropropane, or any other suitable foaming agent known in the art. It has been discovered by the inventors that under the premise of not affecting the performance of the foaming agent, some foaming agents with a higher boiling point may also be added to the first component, resulting in a broadened range of choice for the low boiling point foaming agents. Moreover, the pre-mixing of the organic isocyanate and the high boiling point foaming agent can also improve the performance of the foaming agent. In addition, by mixing the foaming agent of a low cost (such as methyl formate) into the first component, the storage stability of methyl formate and the combined polyether is also improved, and thus the foam cost is reduced.

In a further aspect of the present disclosure, the present disclosure provides a method for preparing a polyurethane foam. The method includes:

controlling a temperature of the first component in the composition kit for preparing the polyurethane foam in a range of 0 to 20° C. to obtain a temperature-controlled first component;

controlling a temperature of the second component in the composition kit for preparing the polyurethane foam in a range of 20 to 40° C. to obtain a temperature-controlled second component; and mixing the temperature-controlled first component and the temperature-controlled second component in a mass ratio of 1:(1 to 0.625) for foaming to obtain the polyurethane foam.

With the method for preparing the polyurethane foam, the polyurethane foam is prepared with the first component including the low boiling point foaming agent and the organic isocyanate and the second component including the high boiling point foaming agent and the polyol composition at different material temperature control conditions. Specifically, the temperature of the first component is low, so as to inhibit the volatilization of the low boiling foaming agent pre-mixed with the organic isocyanate, improve the stability of the organic isocyanate, and reduce the amounts of bubbles and pores in the foam. Moreover, the organic isocyanate has a low viscosity and a low temperature will not lead to an excessive high viscosity. The temperature of the second component is higher, which may significantly reduce the viscosity of the polyol composition, such that the components with higher viscosity such as high performance (i.e., high functionality) polyether polyols can be added into the second component, which not only broadens the range of choice for the foaming agents, but also significantly improves the strength of the prepared polyurethane foam and reduces density and foam thermal conductivity of the prepared polyurethane foam.

Therefore, with the method for preparing the polyurethane foam of the present disclosure, the low boiling point foaming agent is pre-mixed in the first component, the high boiling point foaming agent is pre-mixed in the second component, and the temperatures of the first component and the second component are controlled respectively, so as to make the best of the foaming agents having different performances, broaden the range of options for the foaming agents, and improve performances of the prepared polyurethane foam.

In a still further aspect of the present disclosure, the present disclosure provides a polyurethane foam. The polyurethane foam is prepared by the method for preparing the polyurethane foam as described in the above embodiments. Therefore, the polyurethane foam has the advantages of high strength, good thermal conductivity, less surface foam, low porosity, good flowability and high demolding performance, which may greatly shorten the demolding time and improve the work efficiency in the applications.

The present disclosure is further described with reference to the following examples. It should be noted that these examples are only illustrated and shall not be construed to limit the present disclosure.

In the following examples, raw materials and devices used are as follows:

High-functionality and high-viscosity sucrose-based polyether polyol having a hydroxyl value of 420 mg KOH/g, a viscosity at 25° C. of 20000 mPa·s and a functionality of 6.5, prepared;

Sorbitol-based polyether polyol having a hydroxyl value of 450 mg KOH/g, a viscosity at 25° C. of 8000 mPa·s and a functionality of 5.5, purchased from Nanjing Ningwu Chemical Co., Ltd.;

Sucrose and propanediol-based polyether polyol having a hydroxyl value of 220 mg KOH/g, a viscosity at 25° C. of 700 mPa·s and a functionality of 3.5, prepared;

Toluene diamine and triethanolamine-based polyether polyol having a viscosity at 25° C. of 12000 mPa·s, a hydroxyl value of 420 mg KOH/g and a functionality of 4, purchased from Nanjing Hongbaoli Co., Ltd.;

Phthalic anhydride-based polyester polyol having a hydroxyl value of 320 mg KOH/g and a viscosity of 1800 mPa·s, purchased from Jinling Stepan Chemical Co., Ltd.;

Foaming catalyst: pentamethyldiethylenetriamine (PC-5), purchased from Air Products & Chemicals Inc.;

Gel catalyst: dimethyl cyclohexylamine (PC-8), purchased from Air Products & Chemicals Inc.;

Polymeric catalyst: (2-hydroxypropyl)trimethylammonium formate (TMR-2), purchased from Air Products & Chemicals Inc.;

Silicone oil: L-6988, purchased from Momentive Advanced Materials Co., Ltd.;

Organic isocyanate: PM-200, purchased from Yantai Wanhua Polyurethane Co., Ltd.;

High pressure foaming machine, SYS100PTW, purchased from Cannon, Italy;

Stirring pressure tank, T-150L-SUS, purchased from TONSON Pneumatic motor manufacturing Co. Ltd.

Example 1

Polyurethane Foam was Prepared as Follows:

(1) An organic isocyanate and an organosilicone surfactant were added in a sealed and pressurized organic isocyanate mixing tank with stirring and under a pressure of 0.2 MPa. A material temperature was set at 18° C. A foaming agent was added by a static feeding equipment, and the tank was pressurized to 0.5 MPa and the mixing was performed at this temperature for 1.0 hour. After the mixing, the temperature was reduced to 5 to 10° C. to obtain a first component of a composition kit for preparing a polyurethane foam.

(2) A polyol composition, a composite catalyst, water, and a silicone oil were physically mixed at a temperature of 25° C. and under a pressure of 0.2 MPa, and stirred for 0.5 h to obtain a first mixture. A foaming agent was added by a static premixing device to be mixed with the first mixture under a pressure of 0.2 MPa for 0.5 to 1 h, and the temperature was controlled at 25 to 35° C. to prepare a second component of the composition kit for the polyurethane foam.

The first component and the second component were mixed in a weight ratio of 1:0.78 by a high pressure foaming machine and injected into a cavity of a mold for foaming to obtain the polyurethane foam.

Composition and formulation ratios of raw materials of the first component and the second component are shown in Table 1.

Example 2

The polyurethane foam was prepared in accordance with the steps of Example 1. Composition and ratios of raw materials of the first component and the second component in Example 2 are shown in Table 1.

Example 3

The polyurethane foam was prepared in accordance with the steps of Example 1. Composition and formulation ratios of raw materials of the first component and the second component in Example 3 are shown in Table 1.

Comparative Example

Polyurethane Foam was Prepared as Follows:

A polyol composition, a catalyst, water and a silicone oil were physically mixed at 25° C. and stirred for 0.5 h to obtain a first mixture. A foaming agent was mixed with the first mixture under a pressure of 0.2 MPa by a static premixing device. This second mixing was performed for 1.0 h to obtain a combined polyether. The combined polyether and an isocyanate (PM-200) were mixed uniformly at a mass ratio of 1:1.20 at 18° C. and injected into a cavity of a mold to prepare the polyurethane foam. Composition and formulation ratios of raw materials in Comparative Example are shown in Table 1.

In the above examples and comparative examples, an I-Mold (made of aluminum, having dimensions of 1100×300×50 mm (length×width×height)) is used. A gas vent is disposed on the top of the mold, which may discharge gas generated in the mold during the foaming process. In the foaming process, a high pressure foaming machine from Cannon, equipped with a mixing head connected to an injection hole of the mold is used, and an environmentally friendly, low thermal conductivity polyurethane foam is prepared through a high pressure foaming machine gun head. The rigid polyurethane foam is tested for properties after being aged for a period at the room temperature. Test-related methods and standards are as follows, and performance parameters obtained by the tests are shown in Table 1.

(I) The foam prepared in the I-Mold (having dimensions of 1100×300×50 mm) may be tested for a thermal conductivity, a compressive strength, a molding density and a density distribution.

(II) Same method is used to inject a foam liquid into an H-Mold having dimensions of 700×500×100, and the obtained foam is used to test a demoldability of a foam with different demolding times. Accordingly, an expansion rate is determined, and thus a curing rate of the foam is determined. The mold temperature is kept in a range of 40 to 45° C.

Expansion rate=(maximum foam thickness after demolding−mold thickness)/mold thickness× 100%

(III) According to ISO 12939-01/DIN 52612, the thermal conductivity of the foam is measured at 10° C. (average temperature). After the foam is aged at the room temperature for 24 h, the prepared foam having dimensions of 200×200× 25 mm is tested.

(IV) According to ASTM1622-88, foam having dimensions of 50×50×30 mm is prepared, and the molding core density is measured.

(V) According to DIN53421-06-84, foam having dimensions of 30×30×30 mm is prepared, and the compressive strength of the foam in kPa is measured.

(VI) Dimensional stability: According to GB/T 8811-2008, GDJS-010 constant temperature and humidity test box is used to measure dimensional changes (%) of the foam after 24 h under a condition of a low temperature of −30° C., and a high temperature and humidity condition of a temperature of 60° C. and a relative humidity of 95%, respectively.

(VII) Combined polyether flow index: a plastic hose flow test method is used. According to a paper (Yu Lizhen et al., Polyurethane Industry [J], 2012, 27(1): 35-38), flow index=a height h of foam generated in the hose/a mass m of the foam in the hose.

TABLE 1

Comparison in raw material composition and foam performance between Examples 1 to 3 and Comparative Example

| | materials and reagents | unit | Example 1 | Example 2 | Example 3 | Comparative Example |
|---|---|---|---|---|---|---|
| first component | PM-200 | part by weight | 100 | 100 | 100 | 100 |
| | organosilicone surfactant | part by weight | 0.5 | 0.5 | 1.0 | / |
| | methyl formate | part by weight | / | / | 9 | / |
| | LBA | part by weight | 5 | 2 | / | / |
| | HFC-245fa | part by weight | / | 6 | / | / |
| | HFC-134a | part by weight | 2 | 2 | 2 | / |
| | material temperature | ° C. | 5 | 8 | 10 | 18 |
| second component | sucrose-based polyether polyol | part by weight | 35 | 10 | 20 | 10 |
| | sorbitol-based polyether polyol B | part by weight | 20 | 40 | 20 | 20 |
| | sucrose and propanediol-based polyether polyol | part by weight | 5 | 10 | 10 | 15 |
| | toluene diamine and triethanolamine-based polyether polyol | part by weight | 20 | 30 | 25 | 25 |

TABLE 1-continued

Comparison in raw material composition and foam performance between Examples 1 to 3 and Comparative Example

| materials and reagents | | unit | Example 1 | Example 2 | Example 3 | Comparative Example |
|---|---|---|---|---|---|---|
| | phthalic anhydride-based polyester polyol | part by weight | 20 | 10 | 25 | 30 |
| | PC-5 | part by weight | 0.4 | 0.45 | 0.45 | 0.45 |
| | PC-8 | part by weight | 1.8 | 1.80 | 1.80 | 1.80 |
| | TMR-2 | part by weight | 0.55 | 0.55 | 0.55 | 0.55 |
| | silicone oil L-6988 | part by weight | 2.0 | 2.0 | 2.0 | 2.0 |
| | water | part by weight | 2.20 | 2.20 | 2.25 | 2.20 |
| | cyclopentane | part by weight | 12 | 11 | / | 12 |
| | LBA | part by weight | / | / | 5 | 5 |
| | HFC-134a | part by weight | / | / | / | 2 |
| | material temperature | °C. | 35 | 30 | 25 | 18 |
| a weight ratio of first component to second component | | / | 1.28 | 1.28 | 1.28 | 1.20 |
| cream time | | s | 5 | 5 | 6 | 3 |
| fiber time | | s | 41 | 42 | 45 | 43 |
| flow index | | cm/g | 0.953 | 0.947 | 0.936 | 0.931 |
| free foaming density | | kg/m$^3$ | 20.76 | 20.32 | 20.52 | 21.02 |
| minimum filling weight | | 2 | 452 | 443 | 448 | 461 |
| overfill material | | % | 15 | 15 | 15 | 15 |
| molding core density | | Kg/m$^3$ | 28.67 | 28.03 | 28.32 | 28.96 |
| thermal conductivity λ (10° C.) | | mW/m · K | 18.12 | 18.21 | 18.36 | 18.32 |
| foam compressive strength | | kPa | 136 | 133 | 138 | 123 |
| expansion rate, 3 min | | % | 2.82 | 2.67 | 2.45 | 3.67 |
| dimensional stability | −30° C. | % | 0.5 | 0.6 | 0.2 | 0.9 |
| | 60° C., 95% | | 1.1 | 1.0 | 0.6 | 1.3 |

Analysis of Test Results:

Comparative Example is a typical formula having low thermal conductivity and low density, commonly used in the art. It is shown from the above table that after the first component at a temperature of 5 to 10° C. and the second component at a temperature of 25 to 35° C. in Examples 1-3 are mixed through a high pressure gun head, the Examples 1-3 have higher flow index than that of Comparative Example, thus reducing the viscosity of the combined polyether and improving the flowability of the foaming material. At the same time, the cream time of the foam is prolonged, which improves the flowability of the foaming material in an early stage. The compressive strength of the foam obtained by the preparation of any of Examples 1-3 is higher than that of Comparative Example. Examples 1-3 use high-functionality and high-viscosity sucrose-based polyether to improve the strength of the polyurethane foam. In Example 3, methyl formate is added to the first component to alleviate a swelling side effect of methyl formate foaming agent for the foam. The thermal conductivity of the polyurethane foam prepared by methyl formate and high molecular weight foaming agent (such as HFC-245fa, LBA or FEA-1100) at 10° C. is less than 18.20, and thus heat preservation performance is improved. When the demolding times of all the examples are the same to be 3 min, Examples 1, 2 and 3 have smaller expansion rates and greater compression strengths, which indicates that if a refrigerator box is made of the foams of Examples 1, 2, and 3, the demolding time will be shorter and the overall deformation will be smaller.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, in the case that there is no contradiction among the embodiments and examples, those skilled in the art can combine the different embodiments or examples, or the features of the different embodiments or examples described in the present specification.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A composition kit for preparing a polyurethane foam, comprising:
a first component and a second component disposed in different containers, respectively, wherein the first component comprises an organic isocyanate and a low boiling point foaming agent; and wherein the second component comprises a polyol composition, a high boiling point foaming agent, a composite catalyst including a foaming catalyst comprising pentamethyldiethylenetriamine, a gel catalyst comprising dimethyl cyclohexylamine and a polymeric catalyst comprising (2-hydroxypropyl)trimethylammonium formate, water and a silicone oil, the second component is free of any low boiling point foaming agents, wherein the composite catalyst comprises 1.2 to 2.2 parts by weight of pentamethyldiethylenetriamine, 6 to 8 parts by weight of dimethyl cyclohexylamine and 1.5 to 2.2 parts by weight of (2-hydroxypropyl)trimethylammonium formate.

2. The composition kit according to claim 1, wherein the first component further comprises an organosilicone surfactant.

3. The composition kit according to claim 2, wherein the first component comprises 100 parts by weight of the organic isocyanate, 1 to 30 parts by weight of the low boiling point foaming agent and less than 3 parts by weight of the organosilicone surfactant.

4. The composition kit according to claim 1, wherein the organic isocyanate is a polymeric methylenediphenyl diisocyanate having an isocyanate group content of 30% to 32%.

5. The composition kit according to claim 1, wherein the low boiling point foaming agent comprises 1,1,1,2-tetrafluoroethane, 1,1-difluoroethane, trans-1,3,3,3-tetrafluoropropene, butane or a mixture thereof.

6. The composition kit according to claim 1, wherein the first component further comprises trans-1-chloro-3,3,3-trifluoropropene, cyclopentane, isopentane, n-pentane, methyl formate, formic acid, 1,1,1,3,3-pentafluoropropane or a mixture thereof.

7. The composition kit according to claim 1, wherein the polyol composition comprises 20 to 60 parts by weight of a sucrose-based polyether polyol, 10 to 35 parts by weight of a sorbitol-based polyether polyol, 5 to 15 parts by weight of a sucrose and propanediol-based polyether polyol other than the sucrose-based polyether polyol, 20 to 35 parts by weight of a toluene diamine and triethanolamine-based polyether polyol and 5 to 15 parts by weight of a phthalic anhydride-based polyester polyol.

8. The composition kit according to claim 1, wherein the high boiling point foaming agent comprises trans-1-chloro-3,3,3-trifluoropropene, 1,1,1,4,4,4-hexafluorobutene, cyclopentane, isopentane, 1,1,1,3,3-pentafluoropropane or a mixture thereof.

9. The composition kit according to claim 1, wherein the composite catalyst comprises 1.8 to 2.0 parts by weight of pentamethyldiethylenetriamine, 8 parts by weight of dimethyl cyclohexaneamine and 1.8 to 2.0 parts by weight of (2-hydroxypropyl)trimethylammonium formate.

10. A method of preparing a composition kit for preparing a polyurethane foam, comprising:

(1) mixing an organic isocyanate and a low boiling point foaming agent to obtain a first component of the composition kit;

(2) mixing a polyol composition, a composite catalyst, water and a silicone oil to obtain a second mixture, wherein the composite catalyst comprises 1.2 to 2.2 parts by weight of pentamethyldiethylenetriamine, 6 to 8 parts by weight of dimethyl cyclohexylamine and 1.5 to 2.2 parts by weight of (2-hydroxypropyl)trimethylammonium formate; and (3) mixing the second mixture with a high boiling point foaming agent to obtain a second component of the composition kit.

11. The method according to claim 10, wherein in step (1), the mixing is performed under a pressure of 0.4 to 0.6 MPa for 0.5 to 1.0 h, and a temperature of the first component is in a range of 0 to 20° C.

12. The method according to claim 10, wherein in step (2), the mixing is performed under a pressure of 0.1 to 0.2 MPa and at a temperature of 23 to 27° C. for 0.5 to 1.0 h.

13. The method according to claim 10, wherein in step (3), the mixing is performed under a pressure of 0.2 to 0.5 MPa for 0.5 to 1.0 h, and a temperature of the second component is in a range of 20 to 40° C.

14. The method according to claim 10, wherein step (1) comprises:

mixing the organic isocyanate and an organosilicone surfactant to obtain a first mixture, and mixing the first mixture and the low boiling point foaming agent to obtain the first component of the composition kit.

15. The method according to claim 10, wherein step (1) comprises mixing the organic isocyanate, the low boiling point foaming agent and the high boiling point foaming agent to obtain the first component of the composition kit, wherein the high boiling point foaming agent comprises trans-1-chloro-3,3,3-trifluoropropene, cyclopentane, isopentane, n-pentane, methyl formate, formic acid, 1,1,1,3,3-pentafluoropropane or a mixture thereof.

16. A method for preparing a polyurethane foam from the composition kit of claim 1, comprising:

controlling a temperature of the first component in the composition kit in a range of 0 to 20° C. to obtain a temperature-controlled first component;

controlling a temperature of the second component in the composition kit in a range of 20 to 40° C. to obtain a temperature-controlled second component; and mixing the temperature-controlled first component and the temperature-controlled second component in a mass ratio of 1:1 to 1:0.625 for foaming to obtain the polyurethane foam.

17. A polyurethane foam, prepared from the composition kit according to claim 1.

18. A composition kit for preparing a polyurethane foam, comprising:

a first component disposed in a first container, the first component comprising an organic isocyanate and a low boiling point foaming agent; and a second component disposed in a second container, the second component comprising a polyol composition, a high boiling point foaming agent, a composite catalyst, water and a silicone oil, wherein the composite catalyst comprises 1.2 to 2.2 parts by weight of pentamethyldiethylenetriamine, 6 to 8 parts by weight of dimethyl cyclohexylamine and 1.5 to 2.2 parts by weight of (2-hydroxypropyl) trimethylammonium formate.

* * * * *